V. W. PHILLIPS.
CYCLE SEAT OR THE LIKE.
APPLICATION FILED FEB. 25, 1911.
1,036,702.
Patented Aug. 27, 1912.
2 SHEETS—SHEET 2.
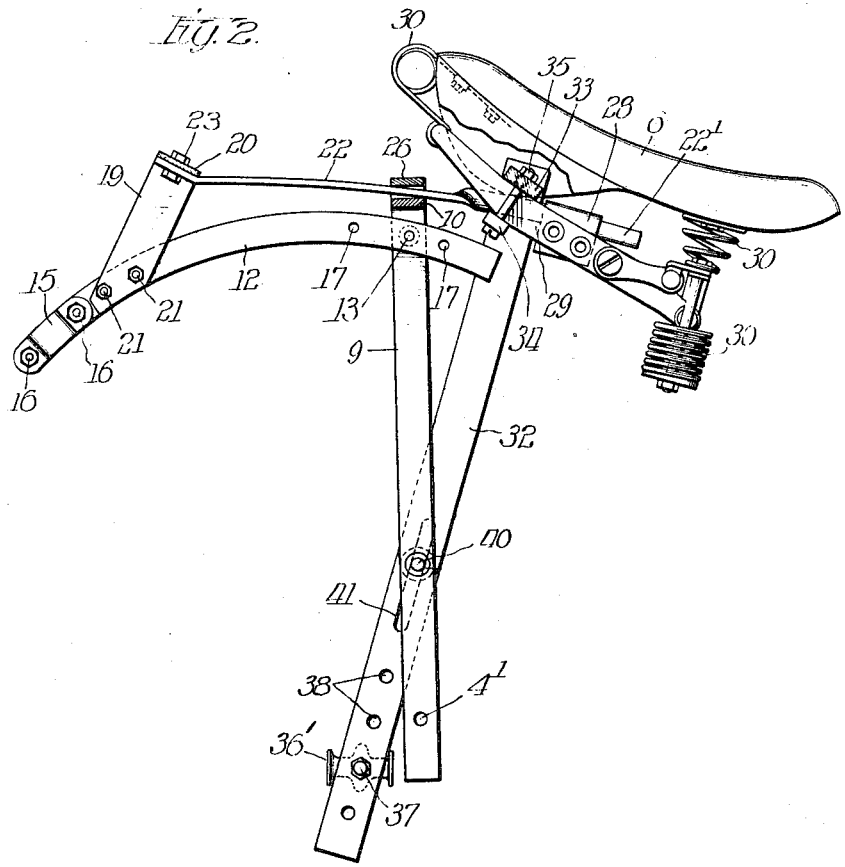
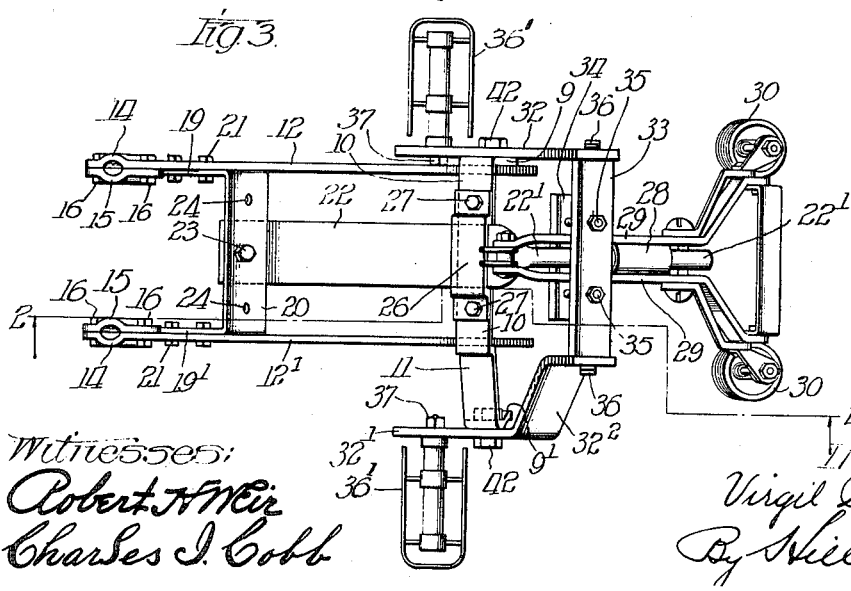
Witnesses:
Robert H. Weir
Charles I. Cobb
Inventor:
Virgil W. Phillips
By Weir & Weir
Attys

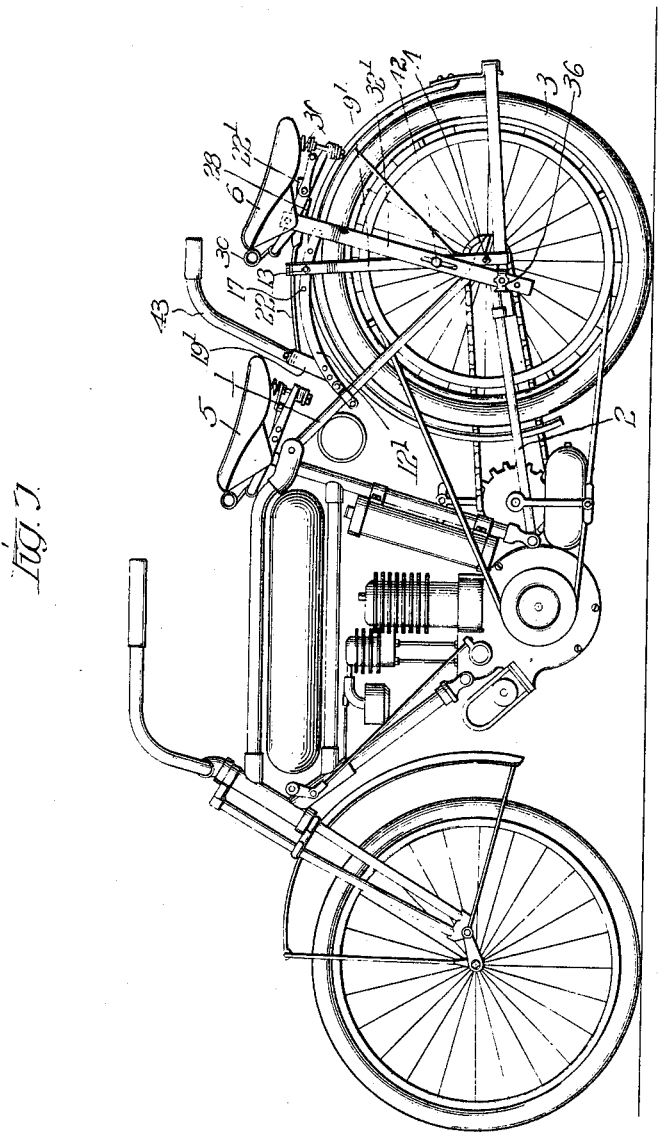

UNITED STATES PATENT OFFICE.

VIRGIL W. PHILLIPS, OF CHICAGO, ILLINOIS, ASSIGNOR, BY MESNE ASSIGNMENTS, TO ANGSTEN-KOCH COMPANY, OF CHICAGO, ILLINOIS, A CORPORATION OF ILLINOIS.

CYCLE-SEAT OR THE LIKE.

1,036,702.  Specification of Letters Patent.  Patented Aug. 27, 1912.

Application filed February 25, 1911. Serial No. 610,953.

*To all whom it may concern:*

Be it known that I, VIRGIL W. PHILLIPS, a citizen of the United States, residing at Chicago, in the county of Cook and State of Illinois, have invented certain new and useful Improvements in Cycle-Seats or the Like, of which the following is a description.

My invention belongs to that general class of devices known as cycle seats or the like, and relates particularly to an additional or rear seat support and foot rest for use on bicycles, motorcycles, or similar vehicles.

My invention has among its objects the production of a simple, convenient, comfortable, efficient, adjustable and satisfactory seat support and foot rest of the kind described, that may be easily positioned on the cycle or removed therefrom if desired.

To this end my invention consists in the novel construction, arrangement and combination of parts herein shown and described, and more particularly pointed out in the claims.

In the drawings, wherein like reference characters indicate like or corresponding parts, Figure 1 is a side elevation of a motorcycle with my invention applied thereto. Fig. 2 is a sectional view of my improved seat, taken substantially on line 2, 2 of Fig. 3, and Fig. 3 is a top elevation of my improved device, the saddle removed.

Referring to the drawings, the motorcycle shown in Fig. 1 represents any type of cycle provided with the usual frame parts or forks 1 and 2, or the equivalent, which are carried by the axle 4 extending through the wheel 3. The usual seat or saddle 5 is provided and mounted upon the vehicle frame in any desired way.

My invention relates to a support for an auxiliary or extra rear seat or saddle 6, which support may be readily attached or detached, and which may be adjusted for different makes of cycles, or for varying weights or sizes, to be carried upon the seat 6, or its equivalent. As shown in the drawings, a U-shaped frame having depending legs or arms 9 and $9^1$ connected at their upper ends as at 10, is provided, each leg being provided with a hole $4^1$, so that the same may be mounted upon the axle 4 and locked in position by the usual nuts. As most clearly shown in Fig. 3, the leg $9^1$ is preferably offset as at 11 so as not to interfere with the driving belt or other mechanism. Secured to the upper end of each of the legs 9 and $9^1$ are frame pieces 12 and $12^1$ respectively, which are adapted to be secured to the fork parts 1. The members 12 may be secured to the depending legs 9 and $9^1$ by bolts 13, or their equivalents, the members 12 and $12^1$ being provided with any desired number of holes 17 so as to permit different adjustment. The other ends of the members 12 and $12^1$ are secured to the fork or the frame in any desired way. As shown, each part is provided with an adjustable clamping member 15, which may be clamped in position by the bolts 16, or their equivalents, the parts 12 and $12^1$ being offset in a manner similar to the clamping parts 15, so that the two depending legs of the fork 1 may be firmly gripped and the support frame be rigidly held.

Secured to the parts 12 and $12^1$ by bolts 21, or their equivalents, is a U-shaped support or frame, consisting of the two legs 19 and $19^1$ and the connecting part 20. Secured to the connecting part 20 by a bolt 23, or its equivalent, is a spring 22, the same being preferably flat throughout the greater portion of its length, and extended over the top of the part 10 of the U frame previously described. The free end of the spring 22 is preferably formed as at $22^1$, or any equivalent manner, to afford a convenient part for the attachment of the clamp 28, which clamps the seat or saddle 6 in position. The spring 22 is preferably maintained in position on the part 10, and prevented from transverse movement by the clamping piece 26 and bolts 27, or their equivalents for the purpose.

The saddle 6 may be of any desired style or form, or it may be in the form of a package carrier, inasmuch as the end $22^1$ of the spring is made of such a size and shape as to be practically standard so that any of the seats or saddles on the market may be applied thereto. This is an important feature, inasmuch as the user is not confined to any particular form of saddle. The seat shown is provided with a frame part 29, to which is secured the clamp 28 mentioned, the seat or saddle part 6 being supported from the frame 29 by a plurality of springs, or resilient members 30, or their equivalents. The position of the saddle upon the spring or support $22^1$ may be as preferred.

Clamped upon the spring 22 or on frame part 29, as shown on the latter, is a bar 33, the clamp shown comprising the bar 33 and a bar 34 and suitable bolts 35. It should be understood that the form of clamp and connection of the bar 33 to the seat frame depends upon the form of saddle used, and may be modified to suit the saddle to be used, the clamp shown, however, being adapted for practically all of the saddles that are on the market.

Supported from the frame or bar 33, and pivotally secured thereto by bolts 36, or their equivalents, are a pair of depending arms or legs 32 and $32^1$, the bar $32^1$ being preferably offset as at $32^2$ similar to the leg 9 heretofore described. The depending arms or legs 32 are pivotally and slidably connected with the legs 9 and $9^1$ by bolts 40 passing through the slots 41 and provided with nuts 42, so as to limit the movement of the lower ends of the arms 32 and $32^1$. Any equivalent arrangement or connection between the two may be employed.

At the lower ends of each of the legs 32 and $32^1$ is provided a foot rest $36^1$ of any suitable form. As shown, these are made in the form of pedals, which may be secured in position by bolts 37. A number of bolt holes 38 may be provided so that the pedals may be adjusted or positioned at the desired point. If desired, a handle bar 43 (see Fig. 1) may be mounted upon the cross end 20 of the U frame described, the same being secured by means of bolts (not shown) which may extend through the holes 24. (See Fig. 3.)

To apply the device to a motor cycle, the lower ends of the depending legs 9 and $9^1$ are secured to the axle 4, and the forward ends of the bars 12 and $12^1$ are secured to the fork of the cycle, the bolts 13 being positioned in the desired holes 17, depending upon the adjustment desired or required. The saddle may then be positioned and the depending legs 32, $32^1$, arranged with the pedals secured at the desired points or distances from the saddle.

It will be seen that the rider is not only resiliently supported on the saddle by the springs 30, but also by the spring 22. The legs 32 and $32^1$ with the foot rests or pedals not only give firm foot rests, but also rests that adjust themselves with the saddle frame 29. In going over rough places the rider may support himself upon the pedals, if desired, being thereby directly resiliently supported from the spring 22. It should be particularly noted that in case of the cycle striking an obstruction so that its speed is suddenly diminished for an instant, the momentum of the rider on the rear seat would tend to throw him forward, but with my form of resilient support for the saddle frame shown, there is no tendency for the seat frame to tilt forward and add to the momentum. By adjusting the upper ends of the legs 9, $9^1$ forward, and passing the bolts 13 through the forward bolt holes 17, a greater resiliency will be given to the spring 22, making the seat particularly adapted for a child or a woman of light weight, while securing the bolts through the last or rear holes 17, the spring 22 will be stiffened, making it more suitable for a very heavy weight person. The pedals being adjustable they may be positioned at any desired point, or that is be fitted to the rider. The whole frame being adjustable, may be applied on practically any type of motorcycle with little work in a few moments time, and be as quickly and easily removed when desired. The device is therefore adapted for all types of motorcycles, for all types of seats or saddles, and for riders of different weights and sizes.

Having thus described my invention, it is obvious that various immaterial modifications may be made in the same without departing from the spirit of my invention, hence I do not wish to be understood as limiting myself to the exact form, construction or combination of parts herein shown and described, or uses mentioned.

What I claim as new and desire to secure by Letters Patent is:

1. In a device of the kind described, a spring member and means for supporting one end thereof, and adjustable means for supporting said spring member intermediate its ends, in combination with a saddle and means for adjustably attaching the saddle to the spring member.

2. In a device of the kind described, a suitable frame adapted to be attached in position, a spring member having one end secured to said frame and supported intermediate its ends by said frame, in combination with a saddle and means for adjustably attaching the saddle proximate the free end of said spring member.

3. An attachment for motorcycles and the like, comprising a suitable frame including a U-shaped part, having its free ends secured to the axle, and means for securing said part to the cycle frame, a spring member, means for supporting one end of said spring member, said spring resting upon the connecting bar of said U-shaped part, in combination with a saddle, and means for attaching the same proximate the free end of said spring member.

4. An attachment for motorcycles and the like, comprising a suitable frame, said frame including a U-shaped part having its free ends secured to the rear axle of the motorcycle, a bar for each arm of said U-shaped part, and means for securing said bars to said arms and to the cycle frame, a spring member, and means carried by said bars for supporting one end of said spring, in combination with a saddle arranged proximate the opposite end of said spring.

5. An attachment for motorcycles and the like, comprising a suitable frame, said frame including a U-shaped part having its free ends secured to the rear axle of the motorcycle, a bar for each arm of said U-shaped part, and means for securing said bars to said arms and to the cycle frame, a spring member, a handle bar, and means carried by said bars for supporting one end of said spring and said handle bar, in combination with a saddle arranged proximate the opposite end of said spring.

6. In a device of the kind described and in combination, a frame comprising a U-shaped part having the depending arms of the U secured to the axle, a side bar for each arm adjustably secured thereto, means for securing the opposite ends of said bars to the cycle frame, a spring, a support for said spring secured to said side bars, said spring extending rearwardly and supported by the connecting parts of said U-shaped part and a saddle, and means for securing said saddle to said spring proximate the rear end thereof.

7. In a device of the kind described and in combination, a frame comprising a U-shaped part having the depending arms of the U secured to the axle, a side bar for each arm adjustably secured thereto, means for adjustably securing the opposite ends of said bars to the cycle frame, a spring, a handle bar, a U-shaped support for said spring and handle bar secured to said side bars, said spring extending rearwardly and supported by the connecting parts of said U-shaped part and a saddle, and means for securing said saddle to said spring proximate the rear end thereof.

8. In a device of the kind described and in combination, a suitable frame comprising a U-shaped part, having its free ends connected to the cycle at the rear axle thereof and extending upwardly over the top of the wheel, a pair of bars connecting the upper end of said arms and the rear fork of the cycle, a connecting part arranged between said bars, a spring member having its forward end secured to said connecting part with its rear end extending over the top of the connecting part of said U-shaped part, means for maintaining said spring in position thereon, a carrier and means for securing said carrier to said spring at the rear of said U-shaped frame.

9. In a device of the kind described and in combination, a suitable frame comprising a U-shaped part, having its free ends connected to the cycle at the rear axle thereof and extending upwardly over the top of the wheel, a pair of bars connecting the upper end of said arms and the rear fork of the cycle, a connecting part arranged between said bars, a handle bar mounted thereon, a spring member having its forward end secured to said connecting part with its rear end extending over the top of the connecting part of said U-shaped part, means for maintaining said spring in position thereon, a carrier, means for securing said carrier to said spring at the rear of said U-shaped frame, a bar depending from the seat on each side thereof, each bar provided with a foot rest proximate the lower end thereof and means for limiting the lateral movement of said bars.

10. In a device of the kind described and in combination, a frame comprising a U-shaped part, having the depending arms of the U secured to the axle, a side bar for each arm adjustably secured thereto, means for securing the opposite ends of said bars to the cycle frame, a spring, a support for said spring secured to said side bars, said spring extending rearwardly and supported by the connecting part of said U-shaped part, a saddle secured to said spring proximate the rear end thereof, a pair of depending foot rest bars carried by said spring, and means for adjustably connecting said bars to said depending frame arms at points between the axle and the top of the frame.

In testimony whereof, I have hereunto signed my name in the presence of two subscribing witnesses.

VIRGIL W. PHILLIPS.

Witnesses:
 Roy W. Hill,
 Charles I. Cobb.